Oct. 27, 1931.         J. HERMAN         1,829,185
METHOD AND MEANS FOR MEASURING DISTORTION OF TELEGRAPH SIGNALS
Filed May 17, 1930     2 Sheets-Sheet 1
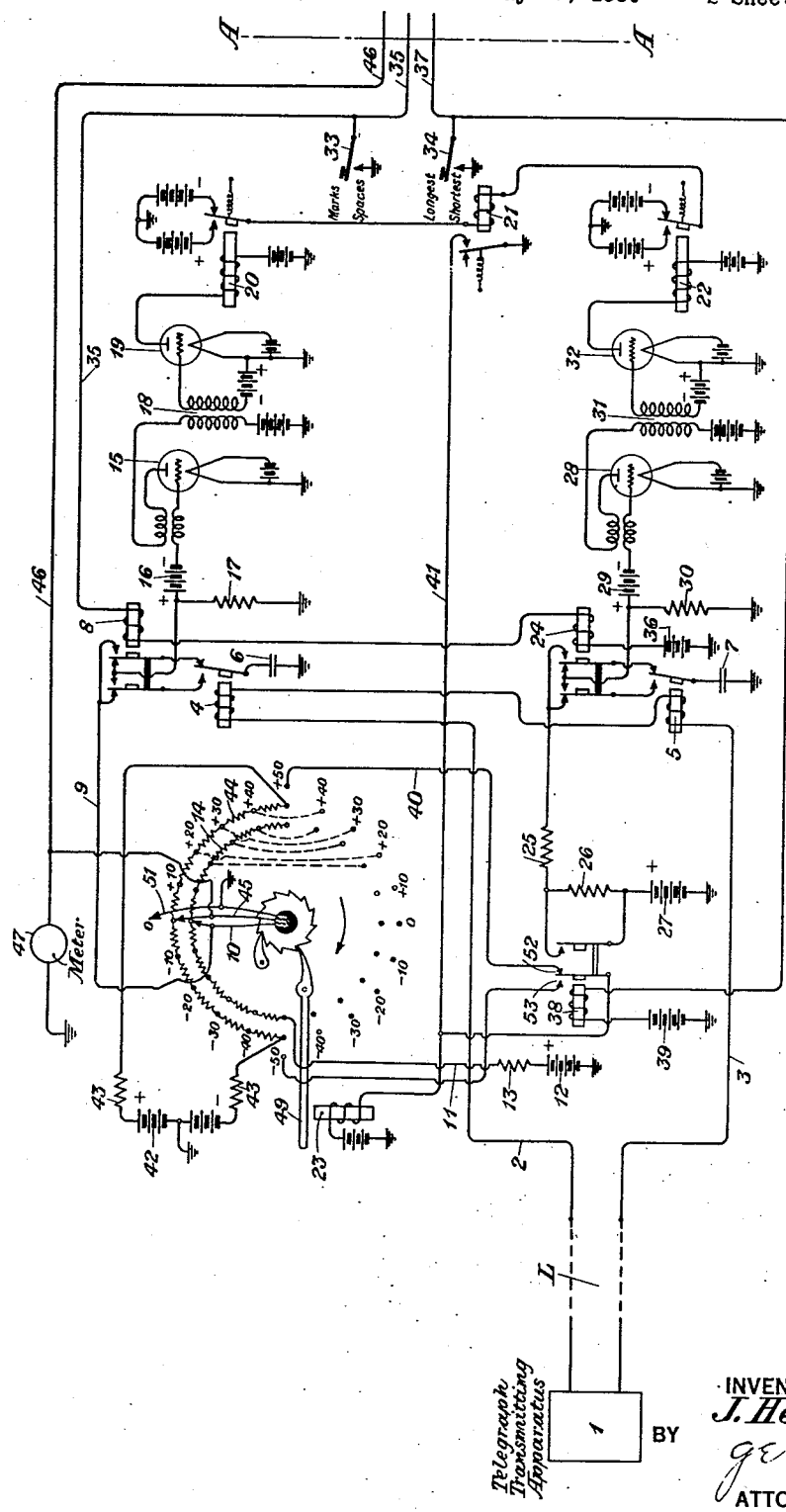
INVENTOR
J. Herman
BY
ATTORNEY

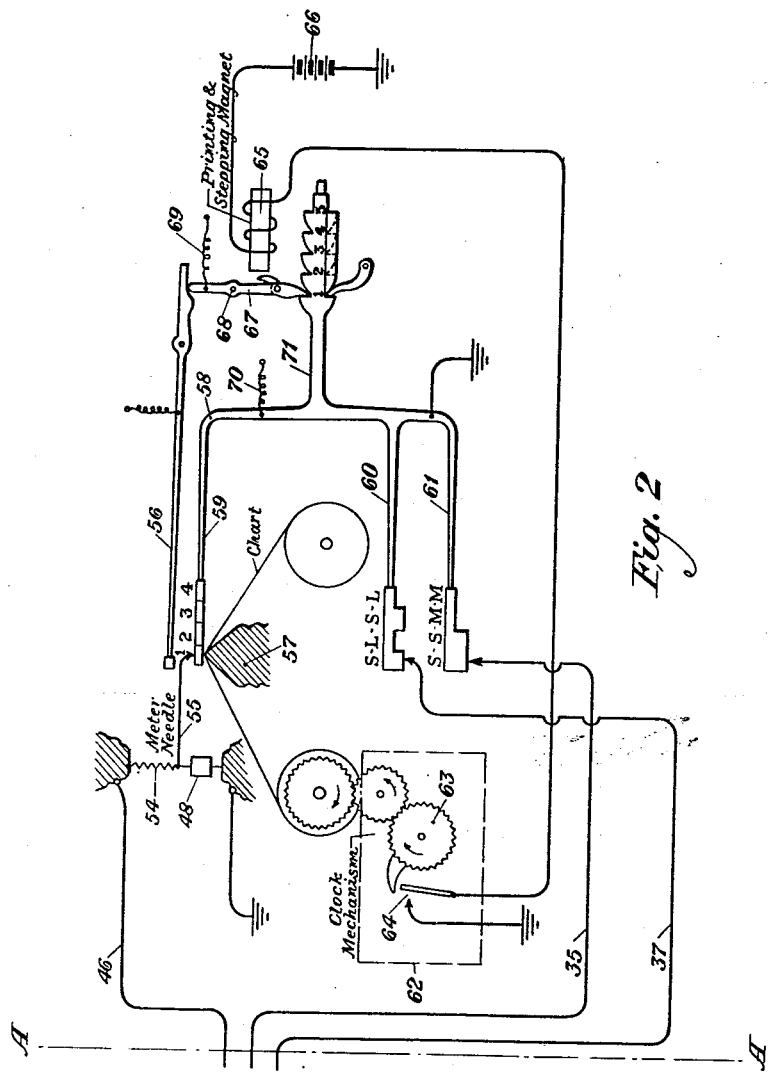

Patented Oct. 27, 1931

1,829,185

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

METHOD AND MEANS FOR MEASURING DISTORTION OF TELEGRAPH SIGNALS

Application filed May 17, 1930. Serial No. 453,279.

This invention relates to a system for measuring the distortion of telegraph signals and particularly to a method and means for giving either a visual indication or a permanent record of the maximum distortion of both marks and spaces.

Numerous systems have heretofore been proposed for measuring the degree of distortion of telegraph signals, but they have had certain disadvantages that limited their use. For example, such systems require the use of a type of signal consisting of unit length impulses only, such as reversals or a C signal, in order to measure the degree of their distortion.

One of the objects of my invention consists in the measurement of maximum distortion of unit impulses occurring during the transmission of any class of signals, which result is obtained by the suppression (in so far as measurements are concerned) of signal combinations whose length exceeds the length of a unit signal by a predetermined amount, whereby the measurements of distortion are automatically limited to signals of unit length. Since the apparatus automatically eliminates from measurement signal parts of undesired length, it will be apparent that the apparatus may be employed upon working circuits over which miscellaneous signal combinations are being transmitted, for example, upon a working printer circuit, without disturbing the normal operation of the circuit.

The invention is further characterized by the automatic recording of the maximum distortion of both marks and spaces at predetermined intervals throughout any given length of time, which feature is of considerable value since it permits the making of stability measurements in terms of maximum distortion upon a circuit over a long period of time with little effort.

This invention will be clearly understood from the following description when read in connection with the attached drawings of which Figure 1 shows the line circuit and the apparatus for giving a visual indication of the magnitude of distortion together with keys for manually controlling the apparatus for the measurement of the longest and shortest marks and spaces, and Fig. 2 shows apparatus for permanently recording the distortion of both types of signals and for automatically controlling such registration, the circuit of the said Fig. 2 being intended for connection with that of Fig. 1 along the dotted line A—A.

In Fig. 1, L represents a line circuit over which telegraph signal impulses are being transmitted from the source 1 representing any well-known type of telegraph transmitting apparatus. The opposite end of the line L is connected with the apparatus for the measurement of distortion. For the sake of simplicity the apparatus ordinarily used for the reception of the signals has been omitted. The line L is connected by conductors 2 and 3 with the relays 4 and 5. The armature of relay 4 is connected with the condenser 6 and similarly the armature of relay 5 is connected with the condenser 7, the purpose of condensers is to store up a charge that is proportional to the magnitude of the distortion. The contacts of relay 4 are connected with the armatures of relay 8, which armatures are arranged to move together. The outer contacts of both armatures are connected together by conductor 9 with contactor 10 that moves over the contact points of the resistance 14, one end of which is connected by conductor 11 with the battery 12, the connection including the resistance 13. The inner contact points of the armatures of relay 8 are connected with the grid of the vacuum tube 15, the connection including a source of negative bias 16. A resistance 17 is connected to ground to provide a discharge path for the condenser 6. The output of tube 15 is connected by transformer 18 with the input of tube 19. The plate circuit of the latter tube includes the relay 20, that may be termed the rectifier relay, which controls through its armature, the polarity of the voltage applied to one terminal of the winding of relay 21. The other terminal of the winding of that relay is connected with the armature of relay 22 which controls the polarity of the potential to be applied to said other terminal. Relay 21 controls the operation of relay 23 which by its operation moves the contactors over the contact points of the resistance dials in the direction represented by the arrow.

The contact points associated with the armature of relay 5 are connected with the armatures of relay 24 that are connected so as to move together. The outer contact points of both armatures of relay 24 are connected through the resistances 25 and 26 with the source of potential 27 by which the condenser 7 is charged. The resistance 26 is proportioned to limit the charge taken by the condenser so that relay 22 will not be operated unless the signal distortion exceeds one and one-half times the length of a unit impulse. The inner contact points of the armatures of relay 24 are connected with the grid of the vacuum tube 28, the connection including a source of negative biasing voltage 29. The resistance 30 that is also connected with the inner contacts of relay 24 affords a discharge path for condenser 7. The output of the oscillator tube 28 is connected by a transformer 31 with the input of the rectifier tube 32 which controls the rectifier relay 22 in the output circuit thereof.

The key 33 controls the apparatus for making measurement of marks and spaces, and key 34 controls the apparatus for measuring the longest and the shortest of the signal impulses. Key 33 is connected by conductor 35 with the windings of relays 8 and 24, the connection including a source of potential 36. When key 33 is open, relays 8 and 24 are deenergized so as to measure marks; when closed, the relays will be energized, and the change in the position of the armatures alters the connections so that the lengths of the spaces may be measured. Key 34 is connected by conductor 37 with relay 38, the connection including a source of potential 39. When the key is open the relay 38 is deenergized and the resistance 26 is effectively connected in series with condenser 7; furthermore, the contact point +50 is connected by conductor 40 through the contact point 52 of the left-hand armature of relay 38, with conductor 41. The operation of relay 38 not only short-circuits resistance 26, but also opens the connection from the contact point +50, and closes the connection from the contact point −50 through the contact point 53 of the armaure of relay 38, to conductor 41. The source of potential 42 together with the resistances 43, and the resistance elements of the distortion dial 44, constitute a potentiometer the voltage of which is applied by the contactor 45 to conductor 46 which causes a current to flow through the meter 47 and also over conductor 46 to the meter element 48 associated with the recording device shown on Fig. 2.

The manner in which the arrangement shown on Fig. 1 operates to produce a visual indication of the maximum distortion of marks and spaces, is as follows: Let it be assumed that keys 33 and 34 are open which is the condition for measuring the maximum elongation of marks. The open condition of key 33 maintains relays 8 and 24 in their released condition and causes the armatures to take the position shown in the drawings. The impression of the marking impulses upon the circuit containing windings of relays 4 and 5 will cause the armatures of both relays to be attracted to their left-hand contacts. Current will accordingly flow from the source 12 over the circuit that includes resistance 13, conductor 11, the resistances of the dial 14 between the left-hand end and the position of the contactor 10 thereon, thence over the circuit including conductor 9, left-hand outer contact of relay 8, left-hand contact of relay 4, and condenser 6, thereby tending to charge the said condenser. Relay 5 will also be operated by the current that flows through relay 4 and accordingly, will attract its armature to its left-hand contact. Current will flow through the circuit that includes the source of potential 27, resistances 26 and 25, left-hand outer contact of relay 24, left-hand contact of relay 5, and condenser 7, which flow of current will tend to charge the said condenser. Upon the termination of the marking impulse relays 4 and 5 will be released and their armatures will drop back against their respective right-hand contacts which will permit the discharge of the said condensers. Condenser 6 will discharge through a path that includes the right-hand contact of relay 4, right-hand inner contact of relay 8, and resistance 17. The constants of the charging circuit are so proportioned that with the contactor 10 on step 0 the positive potential representing the charge on the condenser 6 due to the signal of unit strength will not be sufficient to overcome the negative bias applied by the source 16 to the grid of the tube 15. The tube circuit will not oscillate unless the marking impulse received from the line, which impulse controls the operation of relay 4, is greater than unity. For the purpose of description let us assume that the marking impulse is greater than unity so that the positive drop in voltage through resistance 17 overcomes the negative bias of 16 and permits the circuit of the tube 15 to oscillate. Those oscillations are impressed by the transformer 18 upon the detector 19 and cause the operation of relay 20 in the output circuit of tube 19. Upon the operation of relay 20 its armature will be attracted to its left-hand contact and current will flow through the winding of relay 21, if the armature of relay 22 remains upon its right-hand contact. That it will do provided the incoming signal impulse is less than one and one-half times the length of a unit impulse. That result is obtained by proportioning resistance 26 so that the charge taken by condenser 7 during the time interval in which relay 5 remains operated, will not be sufficient, when discharged through resistance 30, to produce a positive potential to ground sufficiently great to overcome the negative bias of the source 29 unless the incoming signal impulse exceeds one and one-half times the length of a unit impulse. For it will be seen that if the drop in voltage through 30 fails to overcome the bias of the source 29, the circuit of tube 28 will not oscillate and accordingly, relay 22 connected with the output circuit of tube 32 will remain deenergized. Assuming that the length of the incoming marking impulse lies between unity and one and one-half times unity, relay 21 will be operated by the flow of current and will cause the operation of relay 23. Thereupon, it will attract the arm of the lever 49 which coacts with the ratchet that carries the contactors 10, 45 and 51, causing all of the contactors to move around one point in clockwise direction which increases the amount of resistance in series between the source 12 and the condenser 6. It likewise changes the setting of the arm 45 from the midpoint of the potentiometer where the current flowing through the meter 47 and also over conductor 46 to the meter of Fig. 2 is zero, to the +10 position where the current flowing through these meters indicates +10.

If the next marking impulse impressed by the line L upon the circuit of relays 4 and 5 has a length lying between unity and one and one-half times unity, the same sequence of operations will occur. Condenser 6 will take a new charge from the source 12, which, if the signal length is the same as the preceding signal length, will be less than in the preceding case because of the increased resistance of the circuit of the condenser. Upon the termination of the marking impulse relay 4 will be released and condenser 6 will discharge through resistance 17. If the voltage impressed across resistance 17 as the result of the new charge upon condenser 6, is insufficient to overcome the negative bias of the source 16, it will indicate that the adjustment of the setting of contactor 10 has been sufficient to restore balance to the system, and the reading of the meter 47, due to the position of the contactor 45 on step +10 indicates that the length of the marking signals is 10 per cent greater than unity.

If, however, the distortion is greater than 10 per cent the charge taken by the condenser 6 will be sufficient to produce a voltage across resistance 17 that is great enough to overcome the negative bias of 16, and in turn effect the operation of relay 20. This will cause the contactors to step ahead to the position +20, which position will be indicated by a reading of +20 on the meters. This operation will continue until the contactors have reached a position corresponding to the maximum lengthening of the unit signal. Should this be larger than +50, which is the maximum length of signal that will be measured by the apparatus, the contactor 51, when it reaches +50, will place a ground upon the outer stud at this position, which is connected by conductor 40 and contact 52 of relay 38 with relay 23. This will lock the relay 23 in its operated position, thereby preventing further stepping of the contactors.

To measure the shortest marking impulses, key 34 is closed. This causes the operation of relay 38 which short-circuits resistance 26. and at the same time closes contact 53 so as to disconnect the point +50 from relay 23 and connect the point −50 with relay 23. This will permit the stepping of the contactors from the +50 position in a clockwise direction to the +40, +30, etc. contacts of the lower half of the dial, all of which are strapped to the correspondingly numbered contacts of the upper half of the dial, as indicated by the connections shown between the points marked +40, +30 and +20. The operation of relay 5 by the marking impulses causes the condenser 7 to be charged fully by the source 27 so that relay 22 in its output circuit will operate on every marking impulse. Relay 4 will also operate, and the condenser 6 will receive a charge, but if contactor 10 has been left as the result of the previous measurements, upon the higher positively numbered contact points, the resistance in series with the condenser may be so great as to prevent the operation of relay 20. The action therefore of relay 22, which is responding to the succession of marking impulses, causes the operation of relay 21 and in turn causes relay 23 to step the contactors rapidly around in a clockwise direction so as to pass from the +50 to the +40, +30 etc. positions to decrease the resistance that is in series with condenser 6. The latter will accordingly begin to take an increasing charge and when its value is sufficient to cause a drop in potential across resistance 17 large enough to overcome the negative bias of 16, relay 20 will operate. The simultaneous operation of relays 20 and 22 will prevent the operation of relay 21 and will therefore stop the rotation of the contactors of the dial. The reading of the meters due to the position of contactor 45 indicates the maximum shortening of the marking impulses.

In the measurement of spaces key 33 is closed thereby grounding the circuit that includes relays 8 and 24, and the source of potential 36. This causes the operation of those relays and moves their armatures to the right. Key 34 is open and the apparatus is now arranged to measure the longest spaces. It will now be seen that upon the arrival of a spacing impulse, the condensers connected with the armatures of relays 4 and 5 will be charged by the sources 12 and 27 that are connected through the right-hand contacts of relays 8 and 24 respectively with condensers 6 and 7 respectively. Upon the termination of the spacing impulse, relays 4 and 5 will be energized and the movement of their armatures to their left-hand contacts permits the discharge of the condensers through the resistances 17 and 30 respectively. The manner in which the apparatus functions for the measurement of spaces is identical with that occurring during the measurement of marks. That is, if the spaces are greater in length than unity and less than one and one-half times the unit length, relay 22 will remain deenergized and the contactors of the dials will be stepped around by the action of relays 21 and 23 until the charge taken by condenser 6 is unable to produce a positive potential sufficient to overcome the negative grid bias of the source 16. The setting of the contactor 45 causes meter 47 to indicate the degree of lengthening of the spacing impulse. To measure the shortest spacing impulse key 34 is also closed. This operates relay 38 thereby short-circuiting resistance 26, closing contact 53. Relay 22 will thereupon continue to operate so as to step around the contactors until the resistance that is connected by contactor 10 in series with condenser 6 is sufficiently small as to permit the condenser to take a charge that will cause the operation of relay 20 during each spacing impulse as is the case with relay 22. The simultaneous operation of relays 20 and 22 prevents the operation of relays 21 and 23 and the position of the contactor 45 indicates on meter 47 the magnitude of the shortest space.

The apparatus to be employed with the circuit of Fig. 1 for making a permanent record of the magnitude of the distortion of marking and spacing impulses, is shown in Fig. 2. In that figure, 48 represents the moving coil of a meter that is connected between conductor 46 and ground by the filamentary suspension 54. The meter needle 55 is positioned so that its outer end rests below the end of the printing bar 56 and above the support 57 over which passes the paper strip constituting the chart upon which the permanent record is to be made. This chart is arranged to be unwound from the left-hand roll and to be wound upon the right-hand roll. The upper arm 59 of the pronged member 58 carries a multi-colored typewriter ribbon. The spacing of the colors is so proportioned that each corresponds in width to the distance between adjacent notches at the right-hand arm 71 of the pronged member. Another arm 60 carries a contact bar that is so designed that the contact point will touch the said bar in the first and third positions only. That contact point is connected by conductor 37 with the relay 38 of Fig. 1, and it controls the apparatus for the measuring of the shortest and the longest signal impulses. The lower member 61 also carries a contact bar that is designed so that the contact point will touch the said bar in the first and second positions only. That contact point is connected by conductor 35 with relays 8 and 24 and serves to control the adjustment of the apparatus for measuring marks or spaces. A train of gears at the left is operated by a clock mechanism 62 represented schematically by the dotted rectangle. Gear 63 serves not only to operate the left-hand chart roll but also carries a cam that controls the opening and closing of the contact 64. That contact is connected with the winding of the printing and stepping magnet 65, the connection including a source of potential 66. The armature 67 of that magnet is pivoted at the point 68, and has a spring 69 that tends to keep it normally in the position shown in the drawings. The pronged member 58 has a spring 70 that tends to restore it to the position shown in the figure after the four printing operations have taken place.

The manner in which the arrangement shown in Fig. 2 makes a permanent record of distortion will now be described. Let it be assumed that a spacing impulse, whose length is shorter than unity is being impressed upon relays 4 and 5 by the line circuit. At that instant the end of the needle 55 is above the first colored stripe of the typewriter ribbon carried by the arm 59. Also, at that instant, the contact points that are connected with conductors 37 and 35 are touching the contact bars of the arms 60 and 61 respectively which contact bars are grounded. A circuit will accordingly be established from ground over a circuit that includes arm 60, the contact associated therewith, conductor 37, relay 38, battery 39 to ground thereby operating the said relay and causing the short-circuiting of resistance 26 and the closing of contact 53. A circuit will also be established from ground over arm 61, conductor 35, relays 8 and 24 and battery 36, thereby operating relays 8 and 24. It will be remembered that the operation of relays 8, 24 and 38 adjusts the circuit for the measurement of the shortest spacing impulses. The operation of relays 4 and 5 by those spacing impulses will cause the operation of relay 22, which will energize relay 21 and thereby operate relay 23 so as to move the contactors rapidly in clockwise direction over the portion of the dials representing increasing resistance, viz., up to +50, thence over the portion representing decreasing resistance until the charge taken by condenser 6 will be sufficiently great to operate relay 20. Thereupon, the contactors cease moving and the position of contactor 45 upon the dial forming part of the potentiometer will determine the amount of current transmitted over conductor 46 to the meter element 48. The needle 55 will take an angular position corresponding to the current represented by the shortest spacing impulse. During the time required for the operation just-described the gear 63 will have moved the cam so that the latter will touch the movable member of the clock switch thereby closing contact 64. Current from the source 66 will flow through the winding of magnet 65 and will cause the pivoted armature thereof to move in a counter-clockwise direction. The movement of the upper end of 67 under the boss of the printing bar 56 will cause the outer end of that bar to press against the outer end of the needle 55, thus forcing the latter against the typewriter ribbon and making a mark upon the chart, the position of which corresponds with the angular displacement of the needle. At the same time the lower end of 67 is drawn backwards and drops into the second notch of the arm 71. As soon as the cam associated with gear 63 moves out of engagement with the clock switch, the contact 64 is opened and the magnet 65 is deenergized. That permits the armature 67 to move the pronged member 58 to the left through a distance corresponding to the distance between adjacent notches upon the member 71. The outer end of the needle 55 will then be above the second colored stripe of the ribbon, the contact between conductor 37 and the contact bar 60 will be opened, but the contact between conductor 35 and contact bar 61 will remain closed. Relays 8 and 24 remain operated, but relay 38 is released thus adjusting the apparatus for the measurement of the longest space. We will assume that the length lies between unity and one and one-half times that of a unit space. Accordingly, relay 22 will not be operated but relay 20 will be energized and will cause relays 21 and 23 to effect the movement of the contactors in the clockwise direction until the amount of resistance inserted in series with the condenser 6 and the source 12 is sufficient to reduce the charge given to the said condenser to such a level as to prevent the operation of relay 20. The position of contactor 45 at that instant determines the magnitude of the current that will flow from the potentiometer over conductor 46 to the element 48, and accordingly, the position of the needle 55. Thereupon, the cam associated with 63 will close contact 64, and in the manner before described, the angular position of the needle 55 will be denoted upon the chart. Since the color of the point differs from the color of the point previously made, no confusion results in the record.

When the magnet 65 is released and the arm 71 is moved again to the left, the third color of the typewriter ribbon falls below the end of the needle 55 and conductor 37 is again connected to ground through the contact point of the bar 60. Conductor 35 is disconnected from ground by the opening of the contact at the bar 61. The opening of the latter contact releases relays 8 and 24 and puts the apparatus in position to measure marking impulses. The grounding of conductor 37 operates relay 38 and arranges the apparatus to measure the shortest signal. The incoming marking impulses will accordingly cause relay 22 to operate, thereby energizing relays 21 and 23 and cause the contactors to step around rapidly until the charge taken by condenser 6 will be great enough to cause the operation of relay 20. When that occurs, relay 21 will be deenergized and the movement of the contactors will cease. The needle 55 will thereupon take an angular position corresponding to the current transmitted over conductor 46, and that position will be impressed upon the chart by the operation of the printing bar 56 in the manner already described. The movement of the arm 71 to the last position brings the end of the needle over the fourth colored stripe of the typewriter ribbon and simultaneously opens the contacts between the bars 60 and 61, and conductors 37 and 35 respectively. The latter operation puts the apparatus in condition for measuring the longest mark which will be effected in a manner described hereinbefore, and will be recorded upon the chart by the action of the printing bar upon the needle when the clock mechanism has moved the cam through another revolution.

At the end of the cycle of operations described above, the member 71 with which the armature 67 cooperates, will be restored to the position shown in the drawings and another cycle of operations will be begun. The release of the member 71 and its restoration to the original position is due to the fact that after the armature 67 engages with the notch 5 of the ratchet, the pawl does not maintain the ratchet in that position, but lets it slide back to position 1.

The length of time allowed for each measurement will depend entirely upon the intervals between successive contacts of the clock switch, the best value for which will have to be determined by trial.

Although the invention has been disclosed in a single form, it is to be understood that such showing is purely schematic and that the invention is capable of embodiment in other forms without departing from the spirit and scope of the appended claims.

What is claimed is:

1. In a system for measuring the distortion of telegraph signal impulses, the combination with a source of marking and spacing impulses, of a medium over or through which the impulses may be transmitted, and means for recording the maximum distortion of the said impulses resulting from their propagation from the said source as a percentage of the unit length of the said impulses.

2. In a system for measuring the distortion of telegraph signal impulses, the combination with a source of marking and spacing impulses, of a medium over or through which the impulses may be transmitted, and means for periodically and separately recording the maximum lengthening and shortening of the marks and of the spaces of the said impulses resulting from their propagation from the said source as a percentage of the unit length of the said marks and spaces.

3. In a system for measuring the distortion of telegraph signal impulses, the combination with a source of marking and spacing impulses, of a medium over or through which the impulses may be transmitted, a recording device having a galvanometer associated therewith, a potentiometer connected with said galvanometer, means to adjust the setting of the potentiometer in accordance with the distortion of the received signal impulses, and means, controlled by the recording device, to vary the connections of the said adjusting means when changing from the measurement of marking to the measurement of spacing impulses and vice versa.

4. In a system for measuring the distortion of telegraph signal impulses, the combination with a source of marking and spacing impulses, of a medium over or through which the impulses may be transmitted, means to record the magnitude of distortion of the received signal impulses, means responsive to the received impulses to control the operation of the recording means, and means to prevent the operation of the responsive means by a signal impulse whose length exceeds a predetermined limit.

5. In a system for measuring the distortion of telegraph signal impulses, the combination with a source of marking and spacing impulses, of a medium over or through which the impulses may be transmitted, relays responsive to the received impulses, means controlled by one of said relays to measure the distortion of impulses normally of unit length, and means controlled by the other of said relays to prevent the actuation of said first mentioned means by impulses whose length exceeds a predetermined limit.

6. In a system for measuring the distortion of telegraph signal impulses, the combination with a source of marking and spacing impulses, of a medium over or through which the impulses may be transmitted, relays responsive to the received impulses, a condenser, a source of current and a variable resistance adapted to be connected to said condenser by one of said relays, a vacuum tube circuit having a relay connected therewith controlled by the charge upon said condenser, means effectively controlled by the relay of the vacuum tube circuit to vary the setting of the said variable resistance until the condenser charge fails to operate the relay of the vacuum tube circuit, and means controlled by the other of said relays responsive to the received impulses to prevent the actuation of the means for varying the setting of the said variable resistance when the received impulse exceeds a predetermined length.

7. In a system for measuring the distortion of telegraph signal impulses the combination with two receiving relays arranged to be synchronously operated by signal impulses, of a first condenser, and means to charge the said condenser during the interval of operation of one of said receiving relays, an oscillation circuit having a vacuum tube normally biased to suppress oscillations, means to effectively impress the condenser charge upon the said vacuum tube to produce oscillations when the charge exceeds certain limits, means to rectify the oscillations, a relay energized by the rectified oscillations, a second condenser adapted to be charged during the interval in which the second receiving relay is operated, the charging means being designed to limit the current during the measurement of the longest unit impulses, an oscillation circuit having a vacuum tube normally biased to suppress oscillations, means to effectively impress the charge of said second condenser upon last mentioned vacuum tube to produce oscillations when the charge exceeds certain limits, means to rectify said oscillations, a relay energized by said rectified oscillations, a control relay under the joint control of both of the relays operating on rectified current, the said control relay being operated only when one of the said relays responsive to rectified current is operated and the other of such relays is not operated, a stepping relay controlled by the operation of said control relay, and a variable resistance controlled by said stepping relay to vary the charge taken by the first mentioned condenser from its charging means.

8. In a signaling system the combination with a source of current of a plurality of relays connected thereto, a condenser associated with each relay and adapted to be charged upon each operation of the associated relay, an oscillator, associated with each relay, capable of oscillating only when the voltage of the associated condenser exceeds the biasing voltage of the oscillator, a rectifier connected with each oscillator, a rectifier relay, controlling sources of potential of opposite polarity, connected with the output of each rectifier, a control relay, so connected with the armatures of the rectifier relays as to be deenergized when the said armatures of both relays are connected with sources of the same polarity, and a switching device controlled by said control relay.

9. In a system for measuring the maximum distortion of telegraph signal impulses, the method which consists in receiving telegraph signals during the predetermined interval of time, effectively utilizing either the marking impulses or the spacing impulses during the said interval to actuate an electromagnetic recorder whose indication at any instant represents the maximum distortion that has occurred to the impulse being measured from the beginning of the said interval to the aforesaid instant, and effectively recording at the end of the said predetermined interval the maximum percentage of distortion that has occurred during the interval to the impulse under measurement.

10. In a system for measuring the maximum distortion of telegraph signal impulses, the method which consists in transmitting, over or through a medium, marks and spaces representing telegraph signals, effectively selecting during a predetermined interval all of said marks or all of said spaces, effectively measuring the length of successive impulses as selected, and recording at the end of the said interval the percentage variation from normal of that impulse most greatly distorted.

In testimony whereof, I have signed my name to this specification this 15th day of May, 1930.

JOSEPH HERMAN.